Dec. 30, 1930.   A. BARBAGELATA   1,787,303
AUTOMATIC ELECTRIC REGULATOR OR OVERLOAD LIMITING APPARATUS
Filed June 28, 1926
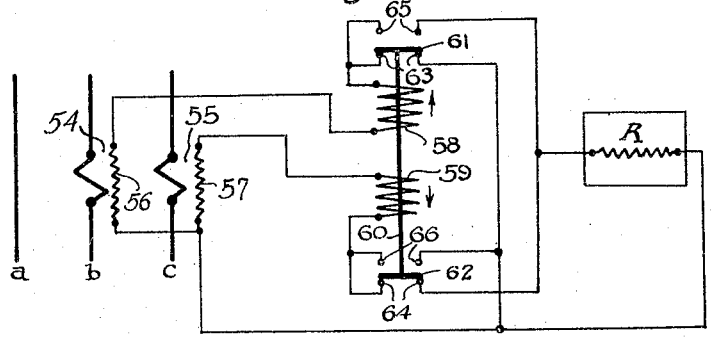
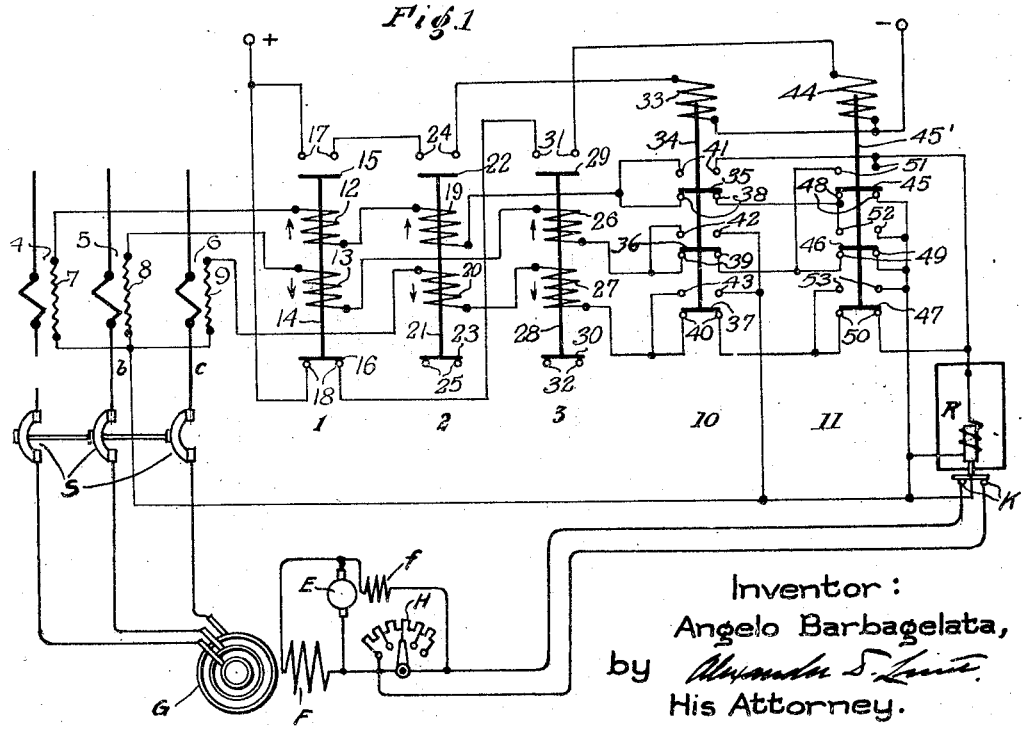
Inventor:
Angelo Barbagelata,
by *Alexander S. Lime*
His Attorney.

Patented Dec. 30, 1930

1,787,303

UNITED STATES PATENT OFFICE

ANGELO BARBAGELATA, OF MILAN, ITALY, ASSIGNOR TO GENERAL ELECTRIC COMPANY, A CORPORATION OF NEW YORK

AUTOMATIC ELECTRIC REGULATOR OR OVERLOAD LIMITING APPARATUS

Application filed June 28, 1926, Serial No. 119,059, and in Italy July 9, 1925.

My invention relates to automatic electric regulators or overload limiting apparatus provided with a single current-responsive operating element or winding, and more particularly to means for controlling the energization of the operating element or winding when said regulators or overload apparatus are used to control the condition of energization of an electric circuit.

When using automatic electric current regulators, relays or similar load limiting devices, having a single one-phase current-responsive operating element in connection with a polyphase circuit, as for example a three-phase circuit, it is well known that two current transformers may be associated with two of the phase conductors of the three-phase circuit with the secondaries cross-connected in accordance with the "reversed V" principle in such a manner as to excite the operating element in accordance with the vectorial resultant of the current in each of the phases in which the current transformers are connected. Such an arrangement effects proper energization of the single element device under balanced current conditions but under conditions of unbalance due to unbalanced loads, single-phase short circuits, or faults from a phase conductor to ground the energization of the single element device may be too great or insufficient to obtain the same condition of regulation or protection obtained under balanced current conditions. Thus, when the current transformer with cross-connected secondary windings are in the two outside wires of a three-phase system supplying a load directly or through step-up transformers connected star-star or delta-delta, a short circuit between the middle and an outside phase conductor of the load circuit, may cause the device to regulate or limit the current in one phase conductor to a value higher than the predetermined value for balanced current conditions with the same calibration of the controlling device. On the other hand, if the current transformers are connected in the outside conductors leading from the generator, and the generator supplies current to a load device through step-up transformers connected in delta-star or star-delta a short circuit between the middle and an outside wire of the load device would result in zero energization of the single element device supplied through the cross-connected current transformers and thereby provide no regulation or protection.

An object of my invention is to provide a new and improved arrangement of apparatus whereby a single operating element or winding of a regulator, overload protective device, or other similar current controlling device may be energized from a polyphase electric circuit in accordance with the current in a phase conductor in which the current bears a predetermined order of magnitude with respect to the current in another phase conductor.

Another object of my invention is to provide a new and improved arrangement of apparatus whereby a single one-phase current responsive operating element of a regulator, overload protective device, or other similar current controlling device may be energized in accordance with the current in a phase conductor which has the largest current flowing therein.

In order to secure the desired energization of the single current responsive element or windings of the regulator or protective device from a polyphase circuit under various operating conditions of unbalance, I provide current transformers in different phase conductors and means for changing the connections of the single current responsive element to a single transformer in a phase conductor in which, for example, the largest current is flowing.

My invention will be better understood from the following description taken in connection wth the accompanying drawing and its scope will be pointed out in the appended claims.

In the accompanying drawing Fig. 1 is a diagrammatic representation of one embodiment of my invention adapted for use in connection with a three-phase circuit and Fig. 2 is a modification of the arrangement shown in Fig. 1.

In Fig. 1 of the drawing I have shown a three-phase distribution circuit comprising conductors a, b and c. Current transformers 4, 5 and 6 are connected in the phase conductors a, b and c, respectively, and are provided with secondary windings 7, 8 and 9, respectively. Three differential main relays 1, 2 and 3 and two auxiliary relays 10 and 11 are shown in their usual position of rest (off-position) and are provided to select the transformer secondary winding which is to provide energization for the current regulating or protective device.

The differential relay 1 may take the form of well-known relays of this type suitable for use on alternating current circuits and comprises two operating coils 12 and 13 for actuating a plunger 14 which carries upper and lower movable contacts for bridging stationary contacts 17 and 18, respectively. Each operating coil tends to move the plunger associated therewith in the direction indicated by the arrows so that if coil 12 has the greater energization the plunger will rise but if coil 13 has the greater energization the plunger will be maintained in its lower position. Similar to differential relay 1, differential relay 2 comprises operating coils 19 and 20 and a plunger 21 which carries upper and lower movable contacts 22 and 23 for bridging stationary contacts 24 and 25, respectively, and differential relay 3 comprises operating coils 26 and 27, a plunger 28 which carries upper and lower movable contacts 29 and 30 for bridging stationary contacts 31 and 32, respectively. The operating coils 12 and 19 of relays 1 and 2, respectively, are energized in accordance with the current in phase conductor a from the secondary winding 7 of current transformer 4, while the coils 13 and 20 operating differentially with coils 12 and 19, respectively, are energized in accordance with the current in phase conductors b and c, respectively, from the secondary windings 8 and 9 of current transformers 5 and 6. The operating coil 26 of relay 3 is energized in accordance with the current in phase conductor b from the secondary winding 8 of current transformer 5 and the operating coil 27 is energized in accordance with the current in phase conductor c through the secondary winding 9 of current transformer 6. In other words, relay 1 is actuated in accordance with the relative magnitudes of the currents in phase conductors a and b; relay 2 is actuated in accordance with the relative magnitudes of the currents in phase conductors a and c; and relay 3 is actuated in accordance with the relative magnitudes of the currents in phase conductors b and c.

The auxiliary relay 10 comprises an operating coil 33 for actuating a plunger 34. The plunger actuates three movable contacts 35, 36 and 37 which serve to bridge stationary contacts 38, 39 and 40 in the lower position of plunger 34, and to bridge stationary contacts 41, 42 and 43 in the upper position of plunger 34. Similarly, auxiliary relay 11 comprises an operating coil 44 and a plunger 45' which carries three movable contacts 45, 46 and 47 for bridging contacts 48, 49 and 50, respectively, in the lower position of plunger 45', and contacts 51, 52 and 53, respectively, in the upper position of plunger 45'. The energizing current for the operating coils of the auxiliary relays is obtained from a station service bus or any other convenient source and is indicated by the plus and minus signs. The auxiliary relays are provided to change over the connections from the operating element R to the desired transformer secondary winding and to maintain the transformer secondaries not connected to R in a closed circuit.

Although my invention is applicable for use in connection with various types and arrangements of current regulators and automatic electric regulating or overload limiting apparatus provided with a single current responsive operating element or winding, I have shown very diagrammatically the operating element R, by way of example, as controlling the excitation of the supply for the distribution circuit in order to control its condition of energization. As shown an alternating current generator G is connected to energize the distribution circuit comprising conductors a, b and c through suitable switching means S. The generator is provided with a main field winding F which in turn is connected to be energized by an exciter E. The exciter is provided with a field winding f which is connected in shunt to the armature of the exciter through a regulating resistor H. The regulating resistor is shunted by a circuit comprising contacts K which are arranged to be closed when the winding R is energized by a current below a predetermined value and arranged to be opened when energized by a current above a predetermined value. It will be observed that when the contacts are opened the resistor H is inserted in series with the exciter field so that the generator field excitation is reduced to limit thereby the current supplied by the generator under balanced overload conditions or under unbalanced conditions of overload or short-circuit.

The single one-phase current responsive device R is connected to the secondary winding 9 of the current transformer 6 in conductor c. The connections in the diagram do not change for any condition of practically balanced load or overload on the three phases. In case of unbalanced overload or of single phase short-circuit, if the overload phase conductor be c, the connections do not change and the regulator will keep the current in the circuit a, b and c within given limits. It may be interesting to note that when $I_c$ is the largest current, even if $I_a$ be larger than $I_b$ by such an amount as to energize relay 1 and the latter closes the upper stationary contacts 17, no change is effected in the connection of R to the secondary winding of current transformer 6.

If in a single-phase overload the largest current be in phase $a$, then $I_a$ being greater than $I_b$ and $I_c$, relays 1 and 2 are energized and close the circuit of the first auxiliary relay 10 which acts to effect the insertion of the regulator R on phase $a$. The sequence of switching and connections for changing the energization of the regulator or protective device R from the current transformer secondary winding 9 to the secondary winding 7 of current transformer 4 in conductor $a$ is as follows: Since the magnitude of the current in phase conductor $a$ is assumed to be greater than the current in phase conductor $b$ or $c$, relays 1 and 2 are moved to a position to cause upper contacts 15 and 22 to bridge stationary contacts 17 and 24 and open stationary contacts 18. Upon closure of contacts 17 and 24 a circuit is completed for operating coil 33 of auxiliary relay 10 which in turn moves its plunger 34 to its upper position to close contacts 41, 42 and 43. When contacts 41 close a circuit is completed from the upper terminal of the secondary winding 7 of current transformer 4, through operating coil 12, operating coil 19, contacts 41, to the upper terminal of the device R. The lower terminal of secondary winding 7 along with the corresponding terminals of secondary windings 8 and 9 are permanently connected to the lower terminal of the device R. When contacts 41 are bridged contacts 42 and 43 are also bridged to maintain a closed circuit for the secondary windings 8 and 9 of the transformers in conductors $b$ and $c$.

Similarly when the largest overload affects phase $b$, the main relay 3 only would be energized (whilst relay 1 is kept down by the fact that $I_b > I_a$) and consequently the auxiliary relay 11 would enter into action, connecting the regulator on the phase conductor $b$ in a manner which will be obvious from the operation hereinbefore described.

So with the above described arrangement, the regulator is always automatically connected to a single transformer viz. to the one of the phases affected by the highest load, thus permitting the regulator or protective device R to be energized by the highest safe load, whatever may happen in the system as to overload or short-circuits.

Fig. 1 is entirely diagrammatic and the various relays shown can be of any known design. The differential main relays 1, 2 and 3 have a position of rest secured by the weight of the armatures but springs or similar biasing means will occur to those skilled in the art and may be used if preferred. Since there must be a certain difference in the currents circulating in the two coils of each relay to lift the armature to the upper position, the connection of the regulator will be changed from one phase to another only if the difference in the current values between each phase and the overload phase reaches a certain finite amount. It is easy to realize however that, owing to the limits within which this difference can be kept, the above limiting condition is unimportant for the scope of the present invention, as the apparatus concerned are never to be considered precision devices.

From the general connection diagram shown in Fig. 1 the modification of my invention shown in Fig. 2 may be immediately derived. In this arrangement only two current transformers are associated with the three-phase circuit comprising conductors similarly designated as in Fig. 1 by $a$, $b$ and $c$. Current transformers 54 and 55 having secondary windings 56 and 57, respectively, are connected in phase conductors $b$ and $c$, respectively. A differential type of relay similar to the relays 1, 2 and 3 of Fig. 1 is arranged to connect the device R across the transformer secondary winding 56 or 57, and comprises operating coils 58 and 59 and a plunger 60 carrying movable contacts 61 and 62. When the plunger 60 is in its lower position (as shown) movable contacts 61 and 62 are arranged to bridge stationary contacts 63 and 64, respectively, and when plunger 60 moves to its upper position contacts 61 and 62 are arranged to bridge stationary contacts 65 and 66, respectively. For the condition shown device R is connected across the transformer secondary winding 57 of transformer 55 associated with conductor $c$ and the secondary winding 56 of transformer 54 associated with conductor $b$ is closed through coil 58 of the relay and contact 61. If the current in phase conductor $b$ becomes greater than the current in phase conductor $c$ contacts 61 and 62 are moved to bridge stationary contacts 65 and 66. This connects the device R across the secondary winding 56 of transformer 54 and closes the circuit of the secondary winding 57 through the relay operating coil 59. The arrangement just described shows how the auxiliary relays can be eliminated when it is sufficient to excite the device R from either of two current transformers but the auxiliary relays are retained whenever other practical working conditions may require it.

According to the arrangement shown in Fig. 2 the regulator or protective device R is usually connected to one of the two current transformers, but as soon as the current in the other transformer becomes greater by a certain amount, the differential relay switches-on automatically the latter transformer.

So, with the arrangement shown in the modification of Fig. 2, the regulator is always influenced by the greater of the two currents and holds the latter within the limits corresponding to its calibration. In the phase not provided with a current-transformer, the current may be held to a value double of that of the other two.

While I have shown and described several particular embodiments of my invention and disclosed the features of it and its possibilities with a few practical illustrations, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a polyphase electric circuit, means comprising an operating element for controlling the condition of energization of said circuit, and switching means operative upon the occurrence of unbalanced conditions in said circuit for selectively effecting energization of said operating element in accordance with the current in a phase conductor in which the current therein bears a predetermined order of magnitude with respect to the current in another phase conductor.

2. In combination, a polyphase electric circuit, means for controlling the condition of energization of said circuit comprising a winding, and switching means operative upon the occurrence of unbalanced conditions in said circuit for connecting said winding to be energized from a phase conductor in which the current is of greater magnitude than the lowest current in a phase conductor of the unbalanced circuit.

3. In combination, a polyphase electric circuit, a device for controlling the condition of energization of said circuit comprising a single one-phase operating element, and switching means operative upon the occurrence of unbalanced current conditions in said circuit for connecting said operating element to be energized from a phase conductor in which the largest current is flowing.

4. In a system of distribution, a polyphase electric circuit, means for controlling the current in said circuit comprising a winding, a plurality of current transformers associated with phase conductors of said circuit, and switching means connected to be responsive to the relative magnitudes of currents in a plurality of phase conductors and operative upon the occurrence of unbalanced current conditions in said circuit for selecting and connecting a single current transformer to energize said winding.

5. In a system of distribution, a three-phase electric circuit, means for controlling the current in said circuit comprising a single current-responsive winding, a current transformer connected in each phase conductor of said circuit, switching means for controlling the connections from the terminals of said current responsive winding to one of the secondary windings of said current transformers, and a plurality of relays each responsive to the current from a plurality of said current transformers and operative upon the occurrence of unbalanced current conditions in said circuit for controlling said switching means to effect a connection from said current responsive winding to the secondary winding of a current transformer in which the largest current is circulating.

6. In a system of distribution, a three-phase electric circuit, means for controlling the current in said circuit comprising a single current-responsive winding, a current transformer connected in each phase conductor of said circuit, switching means for connecting said current responsive winding to the secondary winding of one of said current transformers and for closing the secondary circuits of the remaining transformers, and a plurality of differential relays each responsive to the current circulating in two of the phase conductors of said circuit for controlling said switching means.

7. In a polyphase system, in combination, a regulator for governing supply to the system, detecting devices operable independently from respective phases of the system, and connections between said devices and said regulator providing for energization of the latter upon operation of any of said devices.

8. In a polyphase system, in combination, a control device, means for energizing the same from the several phases, and detecting devices operable independently from the respective phases to cut in the control device.

9. In a polyphase system, the combination with the phase lines, of a current-limiting regulator for regulating current supply to the lines, transformers for energizing the regulator, the respective transformers being energized from respective phase lines, and detecting devices operable from the respective phase lines for connecting the transformers to the regulator.

10. In a polyphase system, the combination with a current regulator for regulating current supply to the system, of transformers energized from the respective phases, and detecting devices energized from the respective phases for connecting the respective transformers to the current regulator.

11. In a system of distribution, a polyphase electric circuit, means comprising a winding for controlling said circuit, a plurality of transformers connected one to each phase of said polyphase circuit, and switching means for selectively controlling the energization of said winding from one of said transformers.

12. In a system of distribution, a polyphase electric circuit, means for controlling the current in said circuit comprising a single current-responsive winding, a plurality of current transformers connected one in each phase conductor of said polyphase circuit, and switching means for selectively connecting said winding to be energized from one of said current transformers.

Signed at Milan, Italy, this 10th day of June A. D. 1926.

ANGELO BARBAGELATA.